United States Patent [19]

Kain

[11] Patent Number: 4,568,122
[45] Date of Patent: Feb. 4, 1986

[54] CHILD BOOSTER SEAT FOR USE IN VEHICLES

[75] Inventor: James M. Kain, Tipp City, Ohio
[73] Assignee: Spalding & Evenflo Companies, Inc., Tampa, Fla.
[21] Appl. No.: 665,888
[22] Filed: Oct. 29, 1984
[51] Int. Cl.$^4$ .................. A47C 31/00; B60R 21/00
[52] U.S. Cl. .................................. 297/488; 297/216; 297/487
[58] Field of Search ............ 297/487, 469, 464, 488, 297/216; 280/473

[56] References Cited

U.S. PATENT DOCUMENTS

| | | | |
|---|---|---|---|
| 2,346,871 | 4/1944 | Provenzano | 297/487 X |
| 2,861,626 | 11/1958 | Mills, Jr. | 297/488 |
| 2,988,135 | 6/1961 | Caminiti | 297/487 X |
| 3,899,042 | 8/1975 | Bonar | 297/487 |
| 3,981,518 | 9/1976 | Pulling | 297/488 X |
| 4,186,961 | 2/1980 | Farrell, Jr. et al. | 297/216 |
| 4,343,510 | 8/1982 | Cone | 297/488 X |
| 4,413,838 | 11/1983 | Varterasian | 297/488 |

Primary Examiner—James T. McCall
Attorney, Agent, or Firm—Donald R. Bahr; John E. Benoit

[57] ABSTRACT

An automobile booster seat for a child having a unitary seat portion and upwardly extending sidewalls and a tubular frame terminating above each of the sidewalls. Mating shields are slidably and rotatably mounted on the terminal ends of the frame above the sidewalls and are rotatable between a mating position in front of the occupant and a raised position above each of the sidewalls so as to facilitate placement and removal of the occupant. The shields are slidable between two positions so as to accommodate occupants of varying sizes. The shields are configured so as to provide an outer channel for accepting an automobile seat belt so as to maintain the seat firmly against the automobile seat when the seat belt is secured.

10 Claims, 8 Drawing Figures

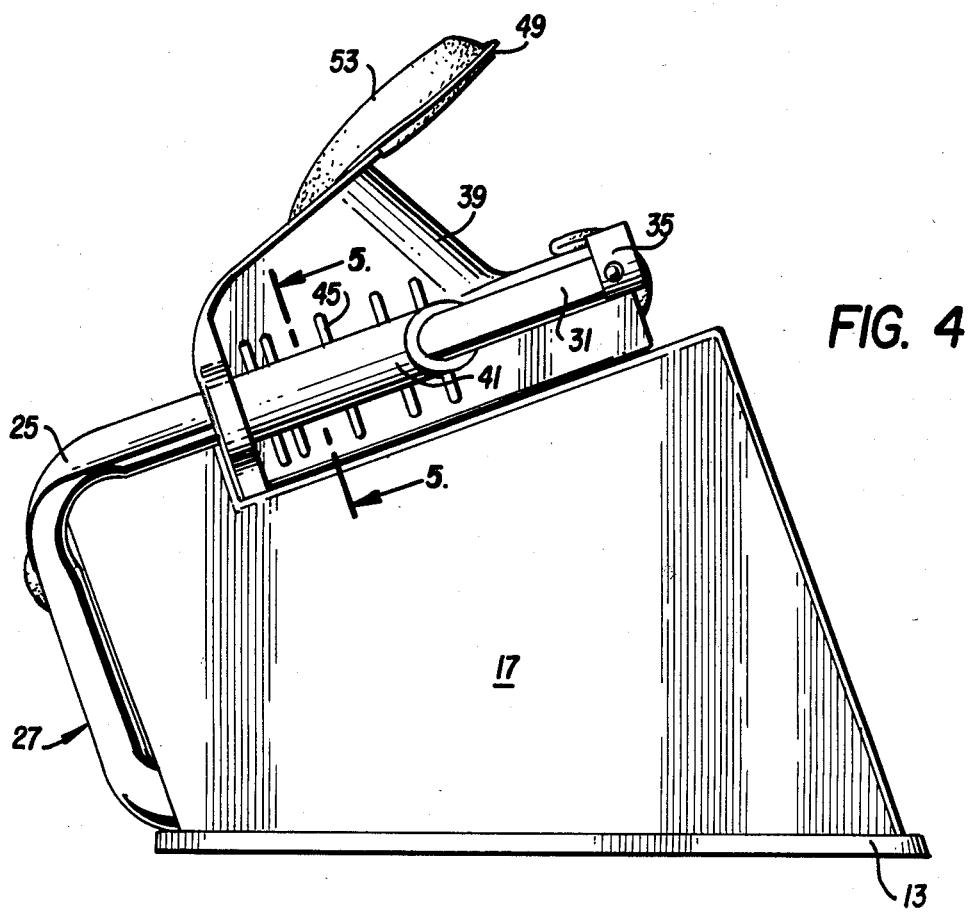
FIG. 4
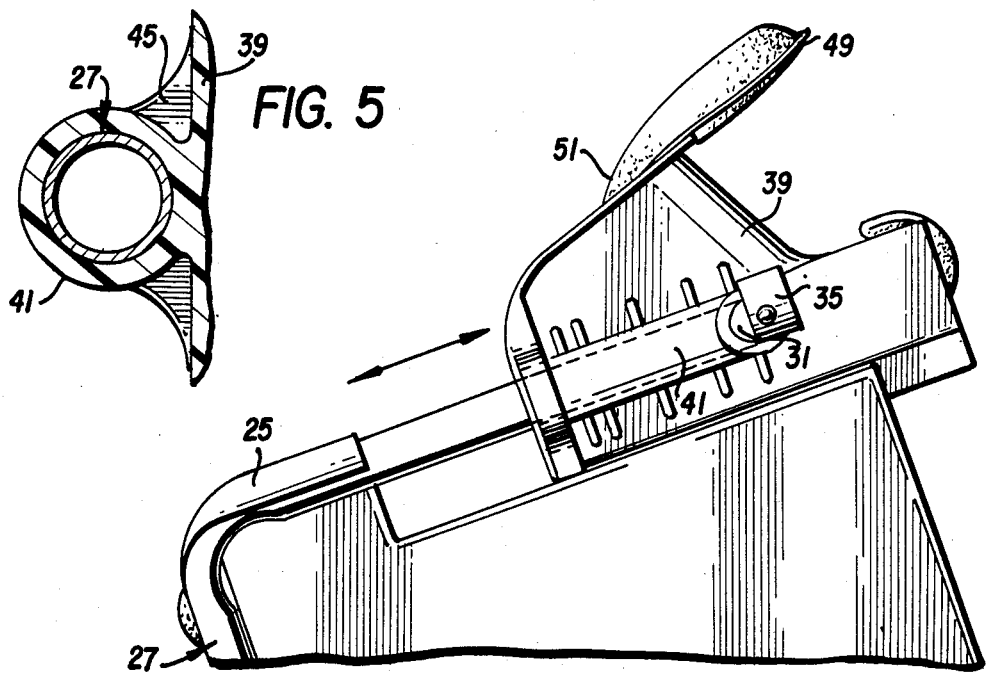
FIG. 5
FIG. 6

CHILD BOOSTER SEAT FOR USE IN VEHICLES

This application is directed to a child booster seat and more particularly to a child booster seat for use in vehicles such as cars, trucks, buses and the like.

BACKGROUND OF THE INVENTION

The problems relative to injury to children when unrestrained in motor vehicles, particularly during rapid deceleration and/or crash conditions is well known. With adults, the safety officials strongly urge that seat belts be worn at all times. With small infants, many states now require that infant seats be used, such seats being of a type which meet the required safety regulations.

However, for children beyond the infant stage, and yet too small to use the seat belt arrangement of the car satisfactorily, there is a need for some additional type of seat. Children falling in this category usually weigh between about 30 and 60 pounds.

A number of vehicular safety seats have been proposed to accommodate children in this particular range. One such seat is shown in U.S. Pat. No. 3,819,232, issued June 25, 1974. This particular seat discloses a unitary seat having no movable parts which includes a shield in front of the child and which is held in place by a seat belt which passes over the child and a part of the seat in which he is placed. Such a seat does not allow for variation in the size of the child nor does it provide a seat which is easily used relative to the placement of the child in the seat. Further, this particular seat may present some problems relative to seat belts which are used in modern day automobiles.

Another such protective device is shown in U.S. Pat. No. 3,424,497, issued Jan. 28, 1969, which shows, basically, a U-shaped shell having a shield thereon. A child is placed on a separate cushion and the shield is placed over the child and the seat belt is passed over the shield. Again, there is no accommodation for variation in the size of the child with the exception of the seat belt itself which is not very satisfactory and, further, the seat does not provide an easy entrance and exit from the seat for the child.

Another such seat is shown in U.S. Pat. No. 3,409,326, issued Nov. 5, 1968, which, in itself, provides a seat which is designed primarily to have vacuum assisted retaining means. The patent does show movable shields or arm rests with very complicated structure, and, which move sideways which again requires additional room on the vehicle seat.

It is an object of the present invention to provide a safety seat for a child generally between 30 and 60 pounds which is easily used in an automobile and which accommodates various size children due to the construction of the device and also provides a means for moving the associated shields into and out of place so as to provide easy access to the seat. Further, the seat easily accommodates to the use of any of the types of automobile seat belts now in use with such seat belts holding the seat firmly in place and, thus, the child therein.

These and other objects of the invention will become obvious from the following description when taken together with the drawings.

BRIEF DESCRIPTION OF THE DRAWINGS

FIG. 4 is a side elevation view of the seat of FIG. 2 with the shield in its rearmost slidable position;

FIG. 5 is a sectional view taken along the lines 5—5 of FIG. 4;

FIG. 6 is a partial side elevation view of the seat of FIG. 2 with the shield in its foremost position;

SUMMARY OF THE INVENTION

The present invention provides an automobile booster seat for a child having a unitary seat portion including sidewalls and a frame terminating above each of the sidewalls. Shields are slidably and rotatably mounted on the terminal ends of the frame above the sidewalls and are rotatable between a mating position in front of the occupant and a raised position above each of the sidewalls so as to facilitate placement and removal of the occupant. The shields are also slidable between two positions so as to accommodate occupants of varying sizes. The shields are configured so as to provide an outer channel for accepting an automobile seat belt so as to maintain the seat firmly against the automobile seat when the seat belt is secured.

Figure 1:
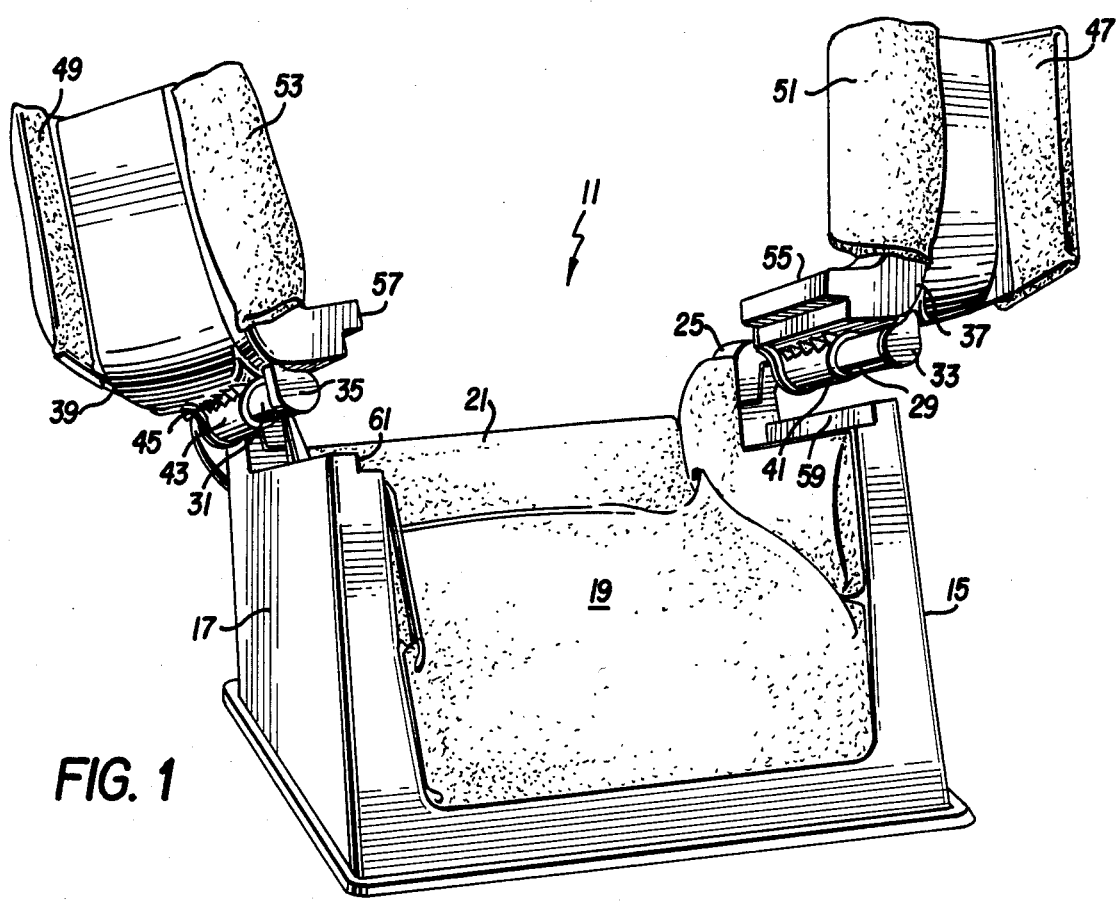
FIG. 1 is a perspective view of the booster seat of the present invention with the shield in its open position.
Figure 2:
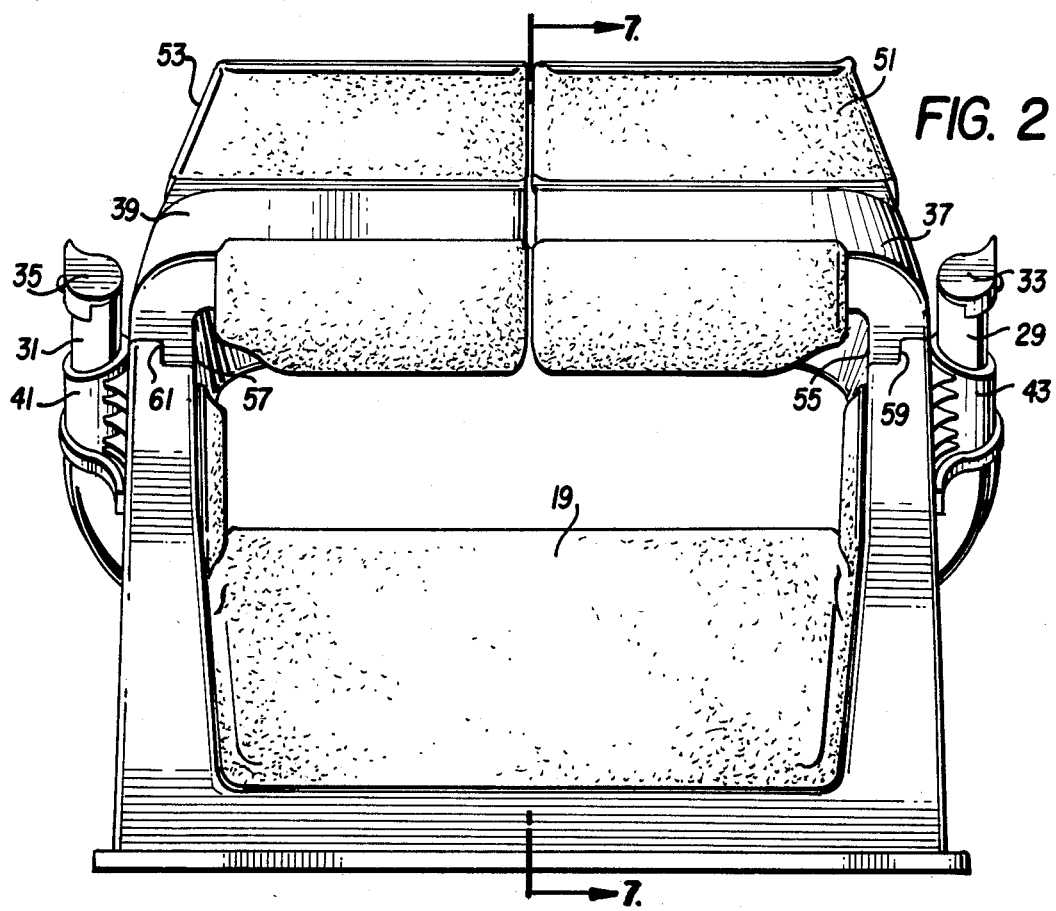
FIG. 2 is a front elevation view of the seat of FIG. 1 with the shield in the closed position.
Figure 3:
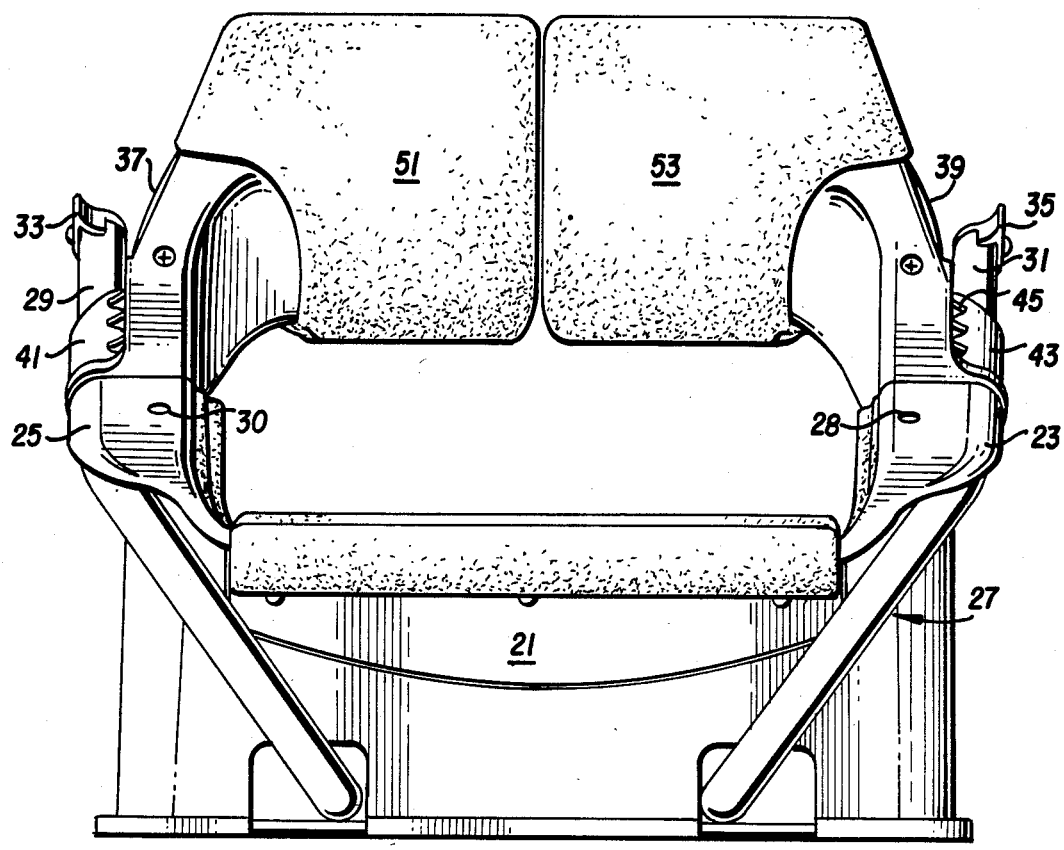
FIG. 3 is a rear elevation view of the seat of FIG. 2.

Turning now to FIGS. 1, 2 and 3, there is disclosed a child's booster seat 11 including base 13, and a seat portion with integral sidewalls 15 and 17. Seat section 18 (FIG. 7) is covered by means of pad 19 which also extends upwardly along the interior of the sidewalls. The pad may be secured to the seat by any well known securing means.

In the particular configuration shown, back 21 is secured to the basic seat as more clearly shown in FIG. 3 and includes flanges 23 and 25 which extend upwardly and outwardly therefrom. These flanges terminate in a semicircular channel which accepts tubular frame 27 which passes thereunder. Stop caps 33 and 35 are placed over the ends of frame 27 for purposes which will become apparent as the description proceeds.

Opposed substantially identical shield members 37 and 39 include integral sleeves 41 and 43. These sleeves are placed over ends 29 and 31 of frame 27 prior to the placement of the stop caps 33 and 35. The sleeves are of a dimension such that they are easily rotatable and slidable along ends 29 and 31 of frame 27.

Arm rests 47 and 49 are secured to the shield and extend outwardly therefrom. The upper part of the shield and the arm rest are covered by cushions 51 and 53 which may be secured thereto by any well known means.

The shields also include flanges 55 and 57 which, when the shields are rotated toward each other mate with shoulders 59 and 61 at the upper part of walls 15 and 17. Accordingly, the mating of the flanges with the shoulders limits the rotation of the shields in a downward position whereby they mate in their lowered position as shown in FIG. 2.

FIG. 4 is a side view of the seat of FIG. 1 with the shields in their down closed position and in their rearward most slidable position where they are retained against the upstanding portion of walls 15 and 17.

FIG. 5 is a cross-sectional view taken along lines 5—5 of FIG. 4 and indicates that sleeve 41 fits snugly about frame 27 but is rotatable and slidable thereon. As indicated, struts 45 are molded about the sleeve so as to provide structural strength.

FIG. 6 is a partial side view similar to FIG. 4 showing the shields in their forwardmost slidable position wherein the sleeve abuts against the stop caps 35. Accordingly, it can be seen that a substantial degree of movement is provided between the two stop means so as to accommodate children of substantially different sizes. As previously indicated, this seat is primarily used for children weighing between 30 and 60 pounds.

Figure 7:
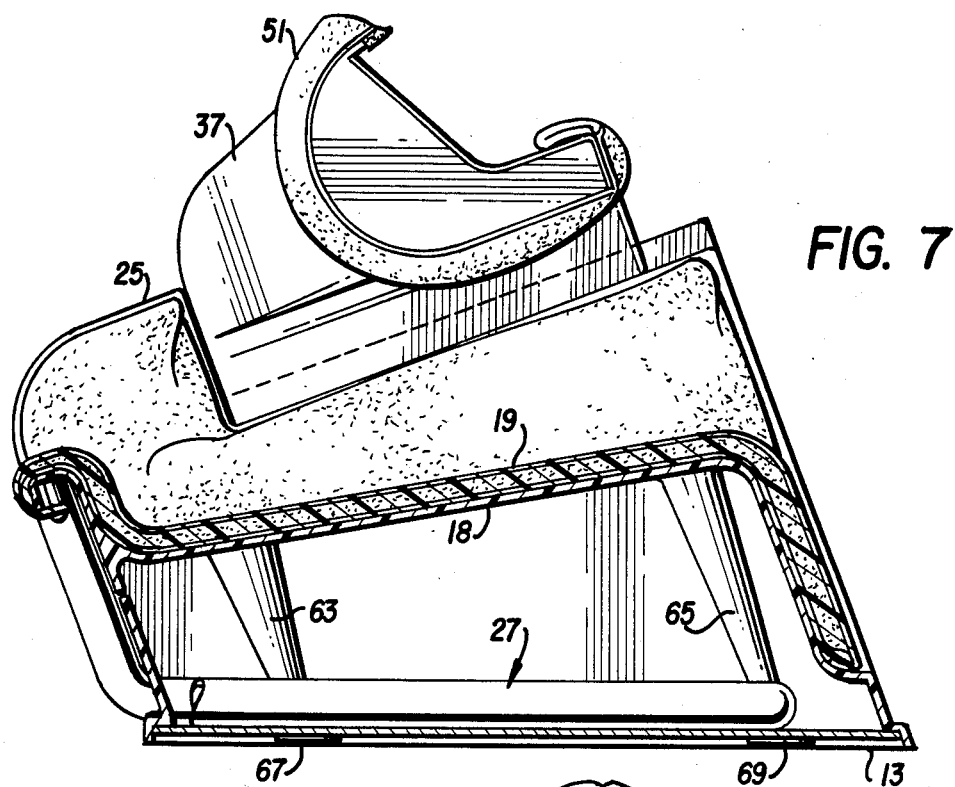
FIG. 7 is a sectional view taken along the lines 7—7 of FIG. 2.

FIG. 7 is a sectional view taken along the lines 7—7 of FIG. 2 and illustrates the basic structure of the seat itself. As can be seen, seat portion including section 18 is of a hollow structure made primarily of plastic and includes struts 63 and 65 which provide the necessary supportive strength. In the embodiment shown, these struts extend downwardly, mate with the lower part of frame 27 and base 13. Frame 27 and strut 69 are all secured together by means such as screws 67 and 69. As indicated, frame 27 is preferably comprised of one continuous piece of tubular metal.

Figure 8:
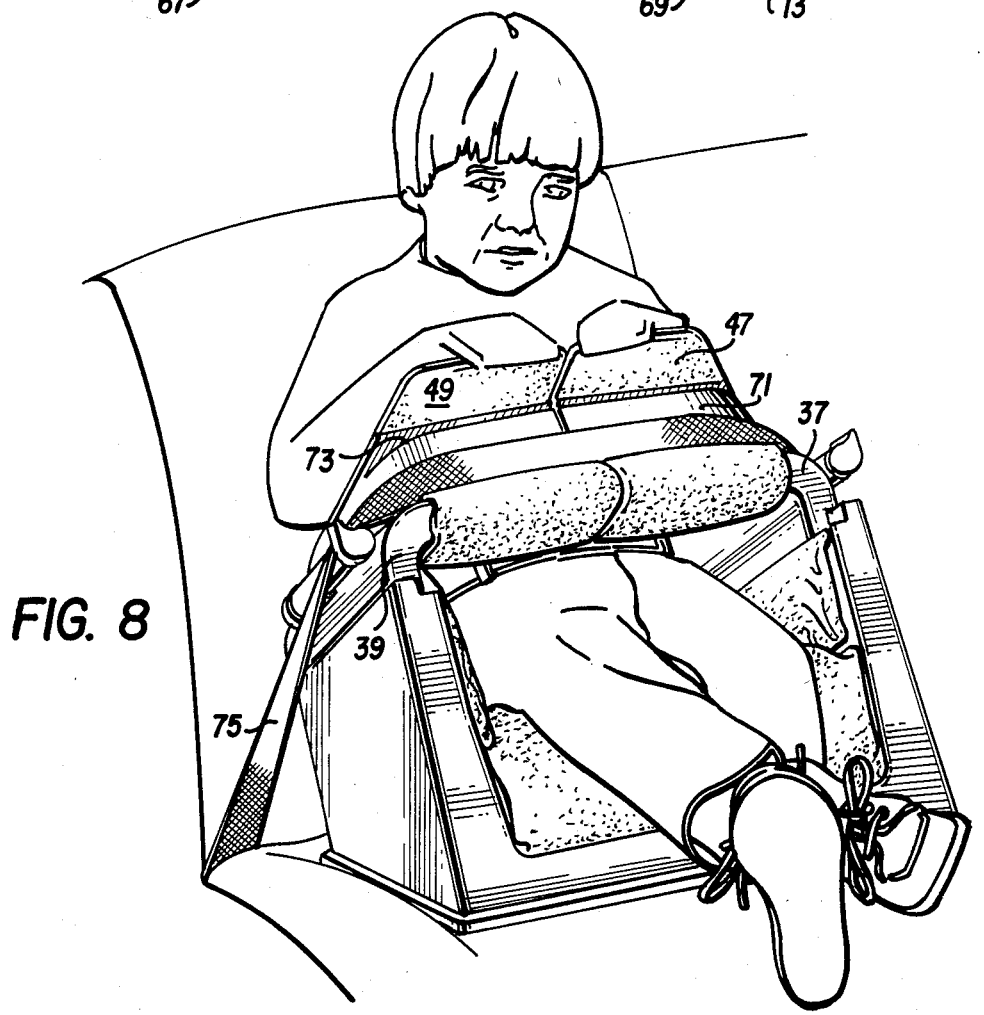
FIG. 8 is a perspective view of the seat of FIGS. 1 and 2 with a child therein and a car seat belt in place.

FIG. 8 illustrates the booster seat in position with a child therein and with the shields folded down into a mating position in front of the child. The structure described hereinabove, that is the shields and arm rests 47 and 49, provide channels 71 and 73 which mate so as to accept automobile seat belt 79 which passes over the terminal ends of frame 27 inside of the stop caps and over the booster seat so as to firmly secure the child seat against the automobile seat when in place. If a shoulder strap is used, it may pass in front of the child if he is of a size such that his body can properly accommodate the shoulder harness. Since the booster seat raises the child substantially above the automobile seat, in most cases this will be acceptable. However, if the shoulder strap cannot be used because of the size of the child, it may be passed behind the child and rest against the back of the automobile seat.

As can be seen, the present invention provides an easily accessible booster seat for a child within the ranges of approximately 30 to 60 pounds and, at the same time, provides easy access and accommodates use of the seat with the automobile seat belt.

The above disclosure is to be considered descriptive only since various components of the seat could be changed without departing from the scope of the invention which is to be limited only by the following claims.

I claim:

1. A child booster seat for use in vehicles comprising a seat portion;
sidewalls extending upwardly from said seat portion;
opposed shields slidably mounted above said sidewalls, said shields being rotatable between a mating position above said seat portion and an open position above said seat portion; and
an open channel along the exterior of each shield of a dimension to accept an automobile seat belt when said booster seat is placed upon an automobile seat.

2. The booster seat of claim 1 further comprising means for limiting the rotation of said shields between said open position above said seat portion and said mating position above said seat portion.

3. The booster seat of claim 1 further comprising means for limiting the sliding movement of said shields between predetermined positions.

4. The booster seat of claim 1 further comprising padding mounted about said shields.

5. The booster seat of claim 1 further comprising means for supporting said seat portion such that the upper part thereof is a predetermined distance above the car seat when in place.

6. A child booster seat for use in vehicles comprising a seat portion;
sidewalls extending upwardly from said seat portion;
a frame member secured to said seat with the ends of said member extending substantially parallel with and terminating above said sidewalls;
slidably and rotatably mounted on said frame member adjacent each of said ends of said frame member; and
an open channel along the exterior of each shield of a dimension to accept an automobile seat belt when said booster seat is placed upon an automobile seat;
said shields being rotatable between a mating position in front of an occupant and a raised position above the adjacent sidewalls so as to provide access to the seat, and being slidable between predetermined positions so as to accommodate occupants of varying sizes.

7. The booster seat of claim 6 further comprising a stop cap on each end of said frame for limiting the forward sliding movement of said shields.

8. The booster seat of claim 6 further comprising abutments extending above said sidewalls for limiting the rearward sliding movement of said shields.

9. The booster seat of claim 6 wherein said frame extends within said seat portion and further comprising means for securing said frame to said seat portion.

10. A child booster seat for use in vehicles comprising a seat portion;
sidewalls extending upwardly from said seat portion;
a shield mounted on said seat above each of said sidewalls, said shields being slidable in a direction substantially parallel with said sidewalls and rotatable between a mating position above said seat portion and an open position above said seat portion; and
an open channel along the exterior of each child of a dimension to accept an automobile seat belt when said booster seat is placed upon an automobile seat.

* * * * *

UNITED STATES PATENT AND TRADEMARK OFFICE
CERTIFICATE OF CORRECTION

PATENT NO. : 4,568,122

DATED : February 4, 1986

INVENTOR(S) : James M. Kain

It is certified that error appears in the above-identified patent and that said Letters Patent is hereby corrected as shown below:

Claim 10, line 10; delete "child" and insert therefor --shield--.

Signed and Sealed this

Twenty-second Day of April 1986

[SEAL]

Attest:

DONALD J. QUIGG

Attesting Officer

Commissioner of Patents and Trademarks